Figure 1:
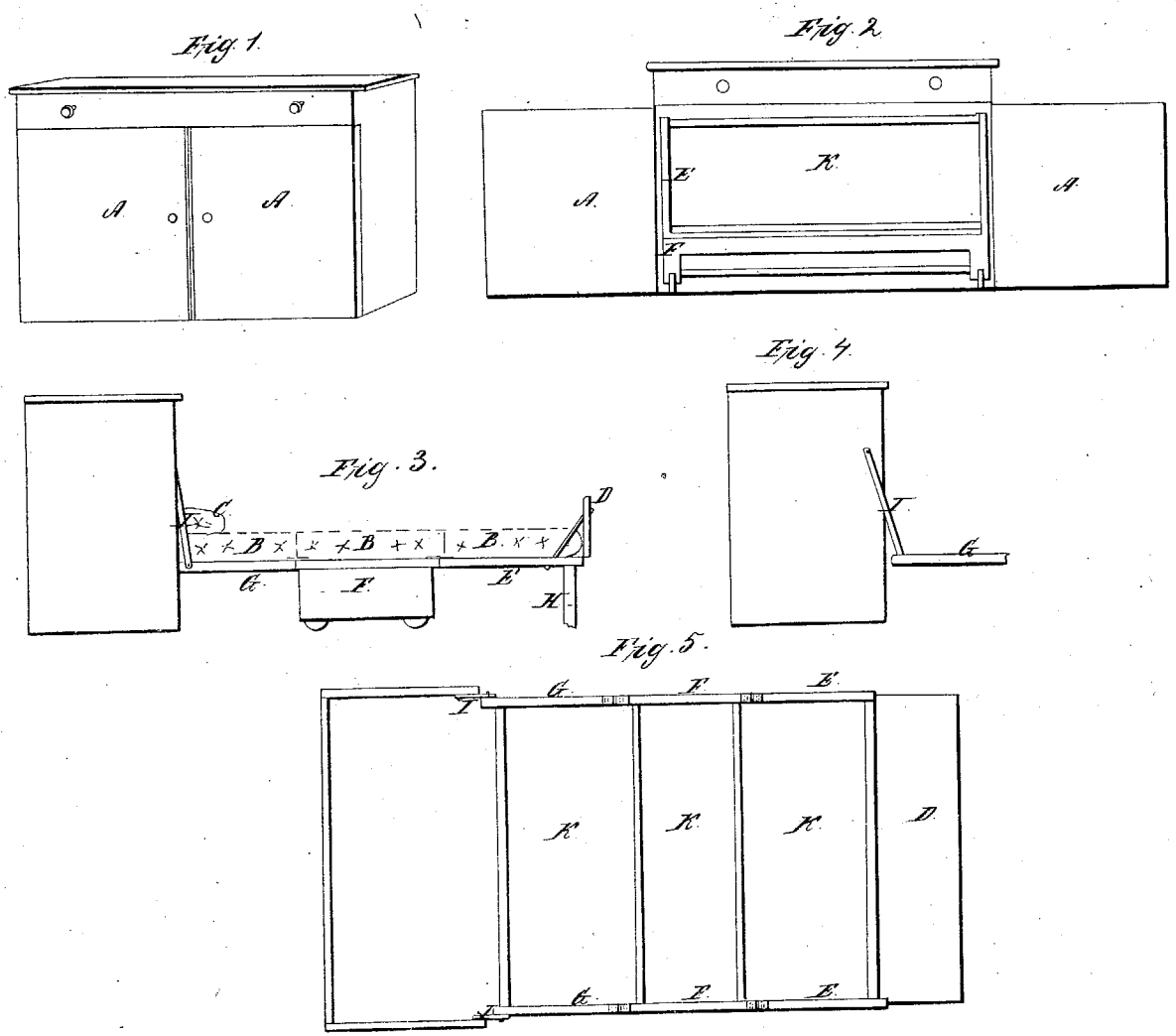
Figure 2:
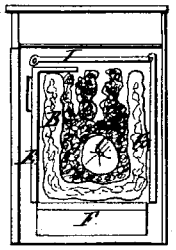
Figure 1:
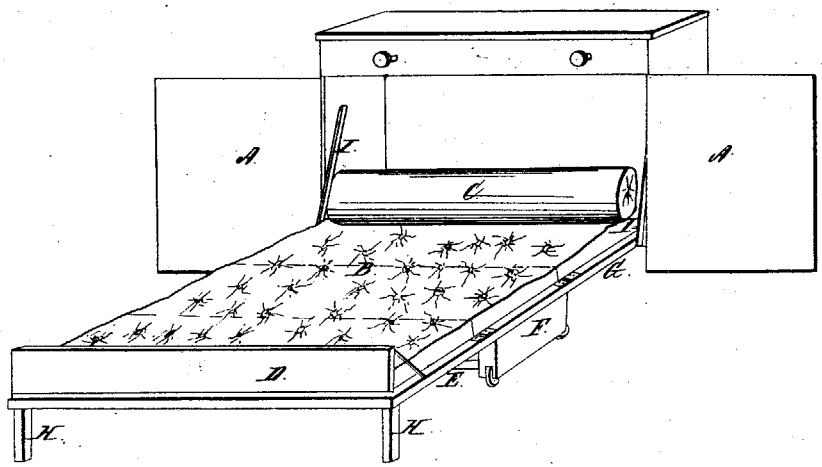

5966X

2 Sheets-Sheet 1,

W. Woolley,

Wardrobe Bedstead,

Patented May 17, 1830.

Witnesses:
Owen G Warren
Thomas S Bates

Inventor:
Williams Woolley

2 Sheets - Sheet 2

5966X

W. Woolley,

Wardrobe Bedstead,

Patented May 17, 1830.

Witnesses:
Owen G Warren
Thomas S Bates

Inventor:
Williams Woolley

May 17. 1830 59606X 511

Williams Woolley
Letters Patent

The Schedule referred to in these Letters Patent and making part of the same containing a description in the words of the said Williams Woolley himself of his improvement in the Bedstead as enclosed within or attached to Presses — Bureaus Sofas &c denominated the secret Bedstead.

---

Williams Woolley's secret Bedstead may be adapted to presses Bureau's Side Boards. Sofas. Counters and to any — other piece of furniture of suitable capacity. The construction is as follows. There are two end pieces or blocks of Hard wood, or other suitable material, connected at their centres by a longitudinal bar at the required distance apart. the blocks or end pieces having castors or rollers by means of which they are moveable at pleasure.

There are two longitudinal frames or leaves which consist of a bar running parallel with the one before mentioned, and having end pieces projecting at right angles from their extremities. These leaves or frames are secured at each side_ the end pieces or blocks and are moveable (not unlike the leaves of a table reversed) at each side the frame by means of bolts or pivots.

The sacking bottom on which the bed is sustained is firmly secured at each side to corresponding bars, the ends of which are let into mortises placed for that purpose at each end of the leaves or frames. The method of tightening is simply by raising one of the leaves and inserting a wedge, the weight of the leaves serving to stretch the sacking. There is a rod of iron attached to each end of the inner leaf and secured at its upper extremity to the side of the press or other article to which the Bedstead is attached. These rods are moveable

[illegible]

by means of bolts or pivots at both ends, and when the bedstead is drawn out are perpendicular and parallel with the outer upright edge of the press and sustain it in a firm and stea dy position. On returning the Bedstead the rods are moved in wards and exert the power of levers by raising the leaf and holding perpendicular when within the press. The other leaf is raised by hand and secured by means of a strap or other con trivance and the whole is enclosed by the doors of the press Witnesses
Wm P. Blagrove
L S Comstock William Woolley End
JHT (440 words) (Patented 17th May 1830.)